United States Patent [19]

Muhlnickel

[11] Patent Number: 5,765,455
[45] Date of Patent: Jun. 16, 1998

[54] LATHE ATTACHMENT

[76] Inventor: Don Muhlnickel, 66435 State Rd. 15, Goshen, Ind. 46526

[21] Appl. No.: 641,539

[22] Filed: May 1, 1996

[51] Int. Cl.$^6$ .................................................. B23B 7/06
[52] U.S. Cl. ............................................ 82/1.11; 82/162
[58] Field of Search ..................... 82/1.11, 127, 129, 82/162, 155, 153, 148; 279/52, 53

[56] References Cited

U.S. PATENT DOCUMENTS

| Re. 33,262 | 7/1990 | Link et al. . | |
|---|---|---|---|
| 2,435,451 | 2/1948 | LeTourneau et al. . | |
| 3,552,243 | 1/1971 | Habegger | 82/162 |
| 3,796,116 | 3/1974 | Spreitzer | 82/148 |
| 4,087,890 | 5/1978 | Ishizuka | 82/162 |
| 4,324,161 | 4/1982 | Klancnik et al. . | |
| 4,379,415 | 4/1983 | Klancnik et al. . | |
| 5,239,901 | 8/1993 | Lin . | |
| 5,289,622 | 3/1994 | Minagawa | 82/1.11 |
| 5,301,405 | 4/1994 | Maker . | |
| 5,421,229 | 6/1995 | Grossmann | 82/129 |

OTHER PUBLICATIONS

Star Micronics Co., Ltd., Hirschmann Corporation; CNC Swiss-Type Automatic RNC-16 catalog.
Hardinge Super-Precision; General Catalog.

*Primary Examiner*—Daniel W. Howell
*Assistant Examiner*—Mark Williams
*Attorney, Agent, or Firm*—Barnes & Thornburg

[57] ABSTRACT

An attachment for a lathe which allows for the precise machining of thin elongated workpieces. The attachment includes a guide bushing which maintains the axial position of a workpiece against radial forces applied thereto by cutting tools. During a cutting operating, the guide bushing moves along the workpiece together with the cutting tools. The attachment can be used in conjunction with a variety of machining lathes.

20 Claims, 4 Drawing Sheets

LATHE ATTACHMENT

TECHNICAL FIELD

The present invention relates to attachments for machine lathes. More particularly, the present invention relates to lathe attachments which allow for the precise machining of thin elongated workpieces.

BACKGROUND ART

Machine lathes are designed with special features which adapt them for large volume production work. Any number of identical parts can be reproduced accurately and rapidly on these machines.

Examples of special features which are used in conjunction with lathes include turrets upon which are mounted a number of various cutting tools. The movement of any particular cutting tool on the turret into its operable position in which it contacts a workpiece allows for a variety of machining operations. U.S. Pat. Nos. 5,239,901 to Lin; 4,379,415 to Klancnik et al; 4,324,161 to Klancnik et al; and Re. 33,262 to Link et al disclose various improvements on automatic turret designs for lathes.

In order to machine a workpiece on a lathe, it is necessary to maintain the axial centering of the workpiece during a machining operation. Conventional lathes support work stock or workpieces by their headstock ends. Supporting a workpiece in this manner allows the free opposite or tailstock end of a workpiece to be machined. Each of the U.S. patents cited above disclose methods and means for supporting workpieces by their headstock ends.

Supporting a workpiece only by its headstock end allows for the accurate machining of the workpiece at or near its tailstock end so long as the workpiece is not deflected from its axial center by forces applied thereto which a cutting tool is pressed against the workpiece. Such tendency to deflect becomes a serious problem when one attempts to accurately machine thin elongated workpieces at or near their tailstock ends. This problem has been addressed in the watch making industry and has been solved to a degree by the design of the "swiss-type" lathe, an example of which is the CNC Swiss-Type Automatic RNC-16 lathe (Hirschmann Corp., Roslyn Heights, N.Y.).

The swiss-type lathe is a specially designed lathe which includes a headstock guiding system that feeds work stock through the headstock support and on through a stationary guide bushing arrangement which can include a revolving or non-revolving bushing and is located in a tooling post that supports the end working tools of the lathe. The guide bushing arrangement maintains the axial centering of the tailstock end of the workpiece against the radial forces applied thereto by cutting tools as the workpiece passes therethrough.

A disadvantage associated with swiss-type lathes is that they are specially designed for machining thin elongated workpieces. They are not designed nor adaptable for machining short workpieces. Similarly, conventional lathes are not designed nor adaptable for machining the tail stock end of thin elongated workpieces which tend to be deflected by radial forces applied thereto by cutting tools.

Accordingly, in order to be able to machine both short and elongated workpieces, machine shops have heretofore found it necessary to acquire separate lathe types, i.e. both conventional and swiss-type lathes. This adds considerable expense, particularly when the need to machine elongated workpieces does not justify the costs associated with acquiring swiss-type lathes.

U.S. Pat. No. 2,435,451 to Le Tourneau et al discloses a machine lathe which includes a work supporting and center rest that allows for a cutting tool to enter the nose of a workpiece as shown in FIG. 2. This lathe is not designed for machining thin elongated workpieces and accordingly does not address or solve the problems associated therewith.

The present invention is directed to an attachment for machine lathes which allows conventional lathes to machine thin elongated workpieces.

DISCLOSURE OF THE INVENTION

It is accordingly one object of the present invention to provide an attachment for lathes which allows for the precise machining of elongated workpieces.

Another object of the present invention is to provide an attachment for lathes which prevents the tailstock end of thin elongated workpieces from being radially deflected by the forces of cutting tools applied thereto.

Another object of the present invention is to provide an attachment for lathes which allows for the precise machining of elongated workpieces, and which can be used in conjunction with a variety of manual and automated lathes.

It is another object of the present invention to provide an attachment for lathes which allows for the precise machining of elongated workpieces, and which can be quickly and easily attached to and detached from conventional lathes.

It is a further object of the present invention to provide an attachment for lathes which allows for the precise machining of elongated workpieces, and which can be used in conjunction with other lathe attachments.

It is a further object of the present invention to provide a method for machining elongated workpieces on a lathe.

A further object of the present invention is to provide a method of converting a machine lathe into a lathe which can accurately machine elongated workpieces.

According to these and further objects of the present invention which will become apparent as the description thereof proceeds below, the present invention provides an attachment for a lathe which includes:

- a guide bushing for receiving and holding an end of a rotating workpiece;
- a support plate for supporting the guide bushing; and
- means for mounting the support plate to the bed of a lathe so that the support plate and the guide bushing are movable with respect to the bed of the lathe.

The present invention further comprises an attachment for a lathe which comprises:

- a guide bushing for receiving and holding the free end of a rotating workpiece and for maintaining the free end of the workpiece along its central axis; and
- a tool support for holding at least one cutting tool, wherein the guide bushing and the tool support are secured to and movable together along a longitudinal bed of a lathe The present invention further provides a method of machining elongated workpieces which involves:

- securing one end of an elongated workpiece in the chuck or collet of a lathe;
- positioning an opposite end of the workpiece through a guide bushing wherein the guide bushing is spaced apart from the chuck or collet; and rotating the chuck or collet and the workpiece while:
   moving the guide bushing along the elongated workpiece and
   contacting the workpiece with at least one cutting tool.

BRIEF DESCRIPTION OF DRAWINGS

The present invention will be described hereafter with reference to the attached drawings which are given as non-limiting examples only, in which.

BEST MODE FOR CARRYING OUT THE INVENTION

Figure 1:
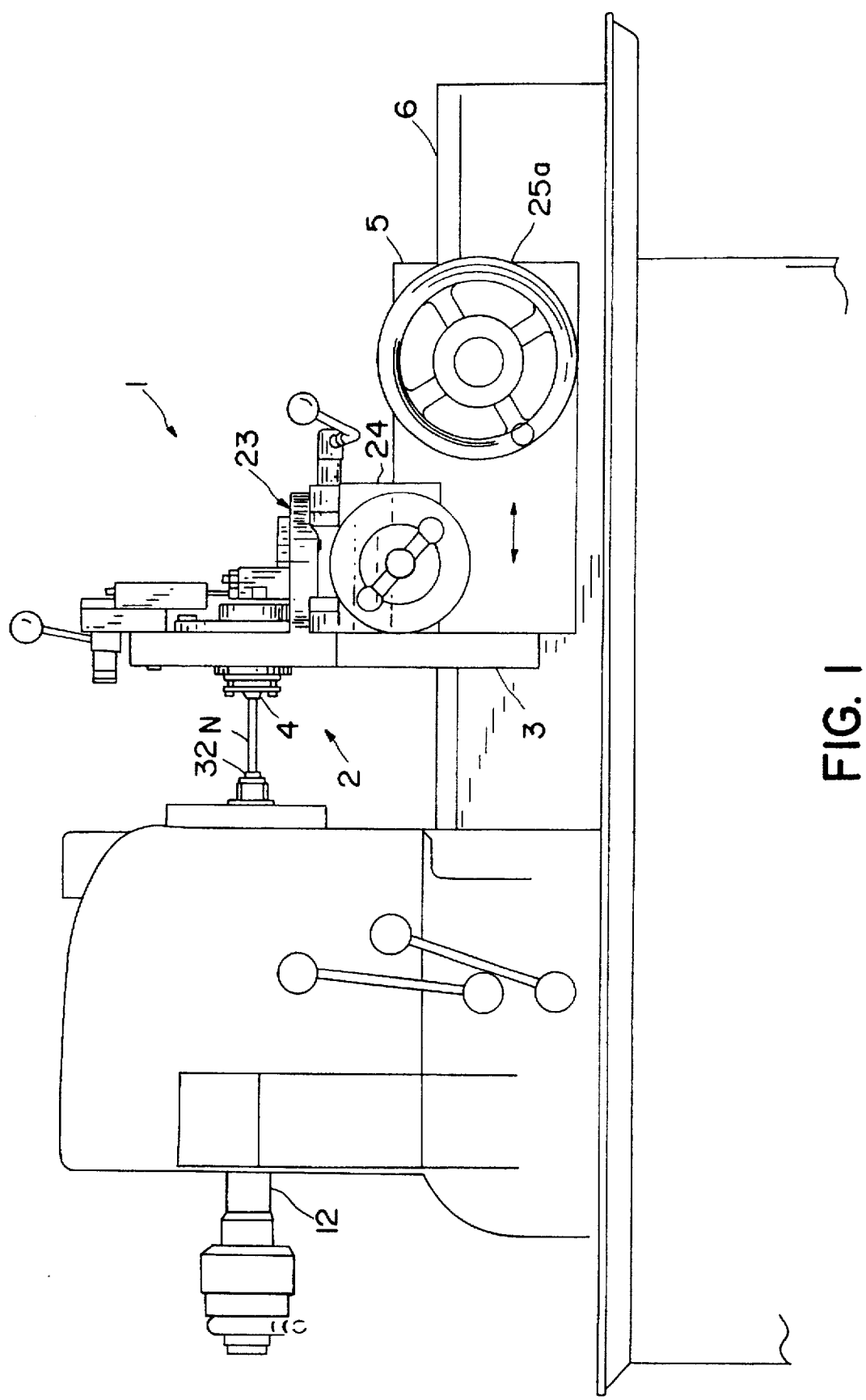
FIG. 1 is a front elevational view of a lathe having a lathe attachment according to one embodiment of the present invention attached thereto.

The present invention is directed to an attachment for machine lathes which allows conventional lathes to machine thin elongated workpieces. The lathe attachment of the present was initially designed for use with manual lathes such as the HC™-AT Chucking Machine and HLV®-DR Toolroom Lathe (Hardinge Brothers, Inc., Elmira, N.Y.), and similar lathes. However, as will be apparent from the description set forth below, the lathe attachment of the present invention is not limited for use with any particular lathe.

The lathe attachment of the present invention includes a tool support and a guide bushing assembly. The tool support is designed to be attached to a cross slide of a carriage assembly which in turn is attached to the bed of a lathe. The carriage assembly is movable along the longitudinal or axial direction of the lathe in a known manner. The cross slide, to which the tool support is attached, is movable along a lateral direction of the lathe with respect to the carriage assembly. Therefore, cutting tools supported on the tool support are movable in both the axial direction and the radial direction with respect to a workpiece held in the lathe. Such carriage assemblies and cross slides are conventional in the machine lathe art.

The tool support is designed to be attached to the cross slide utilizing any suitable mechanical means such as bolts, mechanical clips, mechanical locking fasteners, or the like. The tool support provides a stage upon which one of more cutting tools can be secured using conventional tool holders. The stage is fixed with respect to the cross slide and therefore the cutting tools secured thereby can be moved laterally or radially by the cross slide and longitudinally or axially by the carriage assembly. In a preferred embodiment of the present invention, the tool support is configured to be mounted and secured on the turret shaft of a conventional machining lathe. Thus, in machines such as the HC™-AT Chucking Machine (Hardinge Brothers, Inc., Elmira, N.Y.), the tool support of the present invention is attached by removing the turret and attaching the tool support to the turret shaft.

The guide bushing support plate includes means for securing it to the carriage assembly. These securing means can include through-holes in the guide bushing support plate which align and cooperate with corresponding threaded holes in the carriage assembly. In this arrangement, threaded bolts can be used to secure the guide bushing support plate to carriage assembly. Other mechanical fastener means and arrangements can be used to secure the guide bushing support plate to the carriage assembly, including threaded rods or studs which extend from the carriage assembly and are received in the through-holes of the guide bushing support plate and secured thereto by nuts or other mechanical fasteners.

The guide bushing assembly of the present invention is secured to the carriage assembly so as to be movable only in the longitudinal or axial direction of the lathe. The guide bushing assembly includes a guide bushing support plate and a guide bushing. The guide bushing receives the tailstock end of a workpiece and maintains the axial position of the tailstock end of the workpiece during a machining operation. That is, the guide bushing prevents that tailstock end of a workpiece from being deflected from its axial center when the force of a cutting tool is applied thereto. As will be described in detail below, the guide bushing can be a revolving or a stationary guide bushing.

It is noted that the term "tailstock" as used throughout the specification has been adapted in order to reference the end of the workpiece which is opposite the headstock end. In this regard, use of the lathe attachment of the present invention is more applicable to lathes which do not include conventional tailstock devices, as seen from the drawings.

FIG. 1 is a front elevational view of a lathe having a lathe attachment according to one embodiment of the present invention attached thereto. The conventional elements of the lathe shown in FIG. 1, but not discussed in detail below include the spindle, chuck (or collet), spindle housing and drive mechanism and lathe bed. A detailed description of these conventional elements is not necessary for purposes of understanding the present invention.

As depicted in FIG. 1, the lathe attachment 1 of the present invention includes a guide bushing assembly 2 which includes guide bushing support plate 3 and guide bushing 4. The guide bushing assembly 2 is attached to carriage 5 which moves longitudinally or axially along the bed 6 of the lathe in the direction indicated by the double-headed arrow. The movement of the carriage 5 along the bed 6 of the lathe is controlled by a hand wheel 25a in a conventional manner. Alternatively, the movement of the carriage 5 along the bed 6 of the lathe can be automated utilizing conventional means. A workpiece "w" depicted in FIG. 1 is secured by chuck (or optional collet) 32 at its headstock end and extends through guide bushing 4 at its tailstock end.

Figure 2:
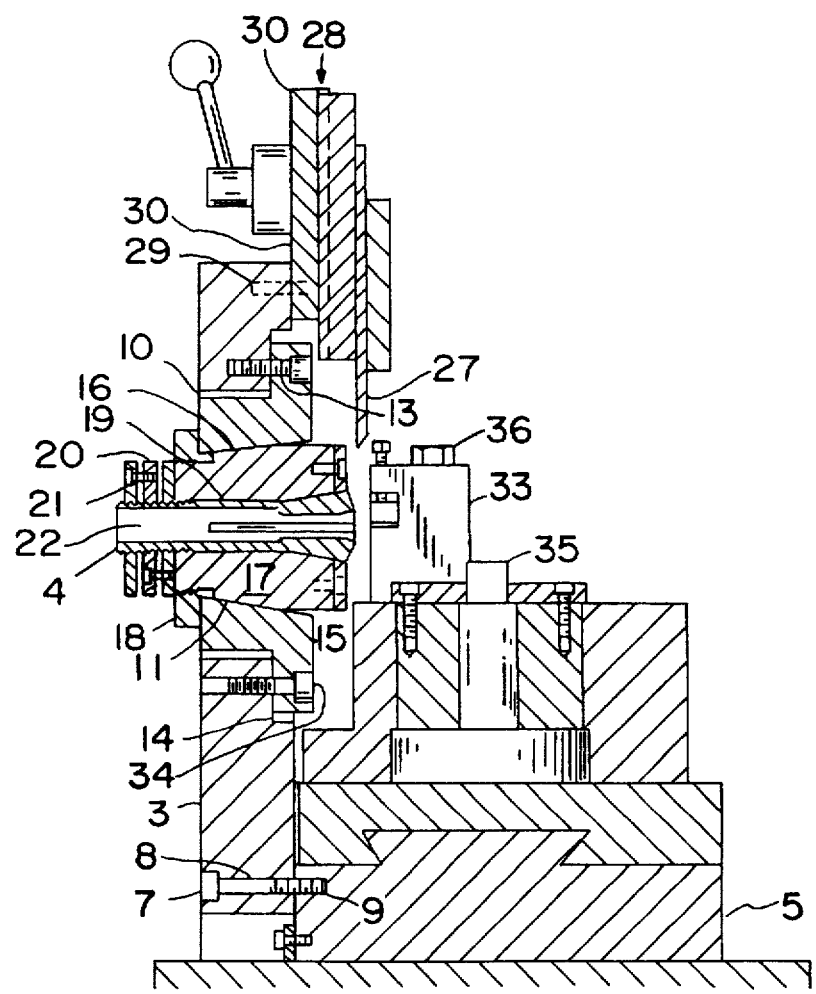
FIG. 2 is a longitudinal sectional view of the lathe attachment of FIG. 1.

FIG. 2 is a longitudinal sectional view of the lathe attachment of FIG. 1. As seen in FIG. 2 the guide bushing plate 3 can be attached to the carriage 5 by suitable mechanical fasteners such as threaded bolts 7 which extend through through-holes 8 in the guide bushing support plate 3 and are received in corresponding threaded bores 9 in the carriage 5.

The guide bushing 4 is supported by the guide bushing support plate 3 by a collar 10 which is received in a through-hole 11 provided in the guide bushing support plate 3. In order to align the guide bushing 4 with the spindle 12 of the lathe (see FIG. 1), the collar 10 includes a number of through-holes 13 positioned symmetrically about the periphery thereof. As discussed below, these through-holes 13 allow for a slight and sufficient amount of adjustment to center the guide bushing 4 with respect to the lathe spindle 12. In a preferred embodiment which is shown in FIG. 2, the through-hole 11 in the guide bushing support plate 3 has a stepped portion 14 and the collar 10 has a flange 15 which is received in the stepped portion 14 of through-hole 11.

The collar 10 includes a centrally located tapered through-hole 16 which receives a correspondingly tapered guide bushing sleeve 17. The sleeve 17 is inserted into the through-hole 16 of the collar 10 and secured therein by means of a threaded ring 18 which draws the sleeve 17 snugly into the though-hole 16 of the collar 10.

In instances wherein a rotatable guide bushing is to be used, the collar can be provided with suitable bearings which will allow the guide bushing to rotated therein.

The guide bushing 4 is inserted into a corresponding shaped centrally located through-hole 19 in sleeve 17 and secured by a threaded ring 20 and locking means 21. The guide bushing 4 includes a through-hole 22 having an end portion which is slightly larger in diameter than the diameter of a workpiece to be machined. This size relationship prevents a workpiece from being deflected by the radial force of a cutting tool applied thereto during a machining operation. That is, radial contact between the workpiece and the inner surface of the guide bushing 4 limits radial deflection of the workpiece. Although the guide bushing 4 shown in FIG. 2 is a stationary guide bushing, it is also possible to use a rotatable guide bushing in the present invention together with a suitable bearing assembly.

Referring back to FIG. 1, the tool support 23 is mounted to a cross slide 24 which moves laterally with respect to the lathe bed 6 or in and out of the plane of FIG. 1. Movement of the cross slide 24 along the carriage 5 is controlled by a hand wheel 25b in a conventional manner. Alternatively, the movement of the cross slide 24 along the carriage 5 can be automated utilizing conventional means. Because the carriage 5 moves in the axial or longitudinal direction, the guide bushing support assembly 2 is limited to movement in the axial or longitudinal direction. However, because the tool support 23 is mounted on the cross slide 24, the tool support 23 can move both in the axial or longitudinal direction and in the lateral direction. This manner of movement allows the guide bushing 4 to move together with the cutting tools 26 (FIG. 3) in the axial or longitudinal direction, while the cutting tools 26 can simultaneously move laterally with respect to the lathe bed 6 or radially with respect to a workpiece. Ideally, the cutting tools 26, which are held in holders 33, are positioned close to the guide bushing 4, e.g. about 1 mm, so that the guide bushing 4 maintains the axial centering of the tailstock end of a workpiece during a cutting operation.

Figure 4:
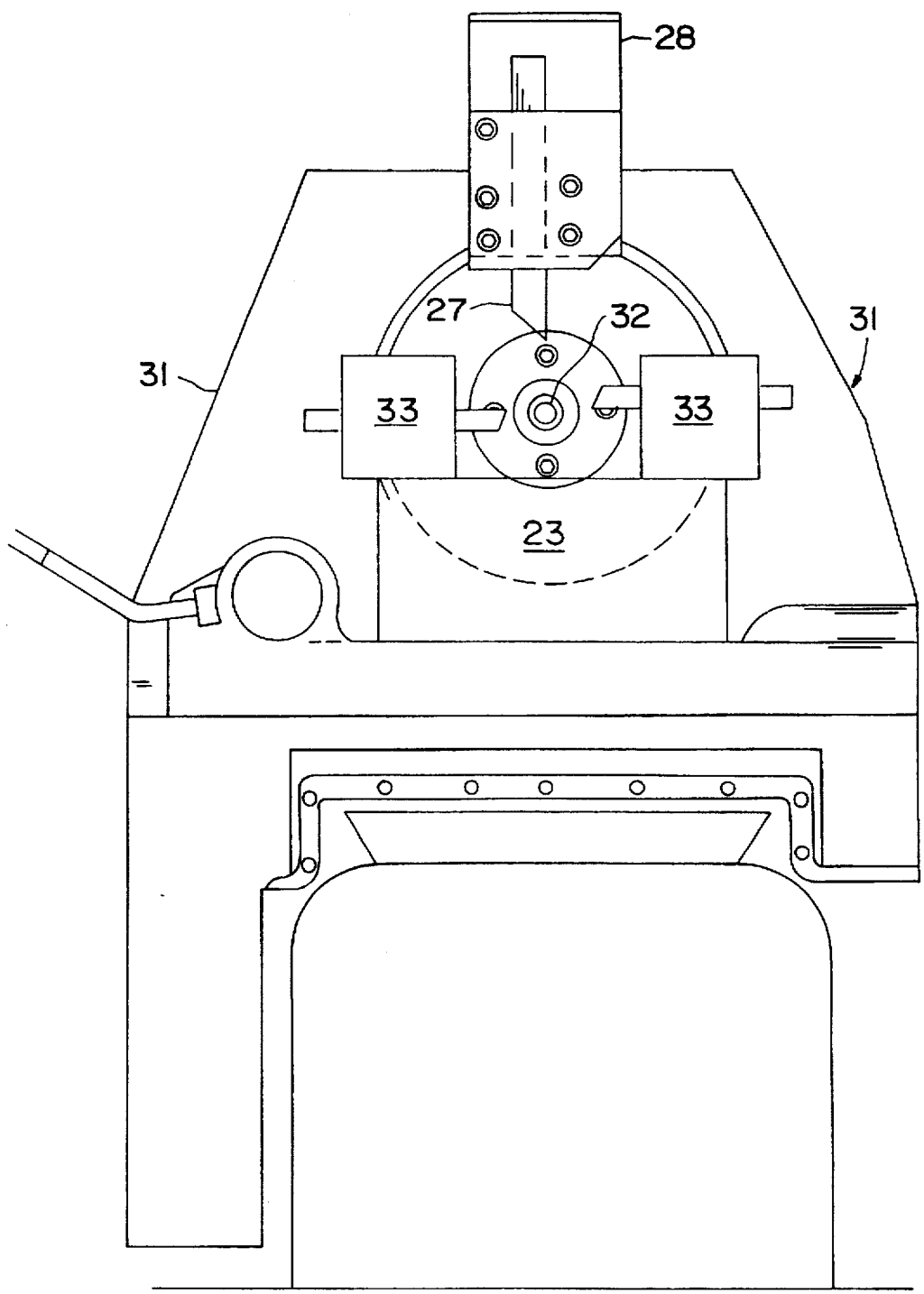
FIG. 4 is an end view of the tool support and carriage of the lathe attachment of FIG. 1.

As shown in FIGS. 1, 2 and 4, an auxiliary cutting tool 27 can be provided on the top portion of the guide bushing support plate 3. The auxiliary cutting tool 27 depicted in FIGS. 2 and 4 is a cut-off tool which can be used to cut off a finished workpiece from the work stock, after machining has been performed by the cutting tools 26 attached to the cross slide 24. The auxiliary cutting tool 27 is attached to the guide bushing support plate 3 by means of a sliding mechanism 28 which allows the auxiliary cutting tool 27 to move radially with respect to a workpiece. The structure of such sliding mechanisms 28 are known to those skilled in the art and can be easily incorporated into the lathe attachment of the present invention. It is also possible to incorporate a sliding tool holding mechanism which is automatically controlled, for example by a servo-motor, in a known manner. It is further possible to incorporate more than one auxiliary cutting tool and corresponding sliding support mechanism on the upper portion of the guide bushing support plate 3. Such modification enables a wider variety of machining operations to be performed either manually or automatically when using servomotors and appropriate control means. It is even possible according to one embodiment of the present invention to eliminate the tool support 23 and instead mount a plurality of auxiliary cutting tools in sliding holders which are attached directly to the guide bushing support plate 3 and automatically or manually operated.

In FIGS. 1 and 2, the sliding mechanism 28 which supports the auxiliary cutting tool 27 is depicted as being attached to the top portion of the guide bushing support plate 3 by means of mechanical fasteners, i.e., bolts 29. In a more preferred embodiment of the present invention, the sliding mechanism has a base 30 which is integral, i.e., formed as a single casting, with the guide bushing support plate 3. Forming the base 30 of the sliding mechanism 28 in this manner allows for a more contoured design.

The upper portion of the guide bushing support plate 3 has a particular shape which is best shown in FIG. 4. As shown, the guide bushing support plate 3 has upper side surfaces 31 which are angular. The reason that the guide bushing support plate 3 is provided with upper angular side surfaces 31 is to provide clearance for other lathe attachments such as threading attachments. For example, the shape of the guide bushing support plate depicted in FIG. 4 allows the lathe attachment of the present invention to be used when the standard automatic threading attachment of the HC™-AT Chucking Machine is attached to the machine. In this illustrated embodiment, the upper angular side surfaces 31 of the guide bushing support plate 3 provide the clearance necessary to allow the lathe attachment of the present invention to operate without having to remove the threading attachment from the lathe. Since the lathe attachment of the present invention can be used without removing the threading attachment, change over time between threading and other machining processes and can be eliminated. It is to be understood that it is within the scope of the present invention to provide the upper portion of the guide bushing support plate 3 with an appropriate shape so that the lathe attachment of the present invention can accommodate various other lathe attachments in addition to the threading attachment noted above.

Figure 3:
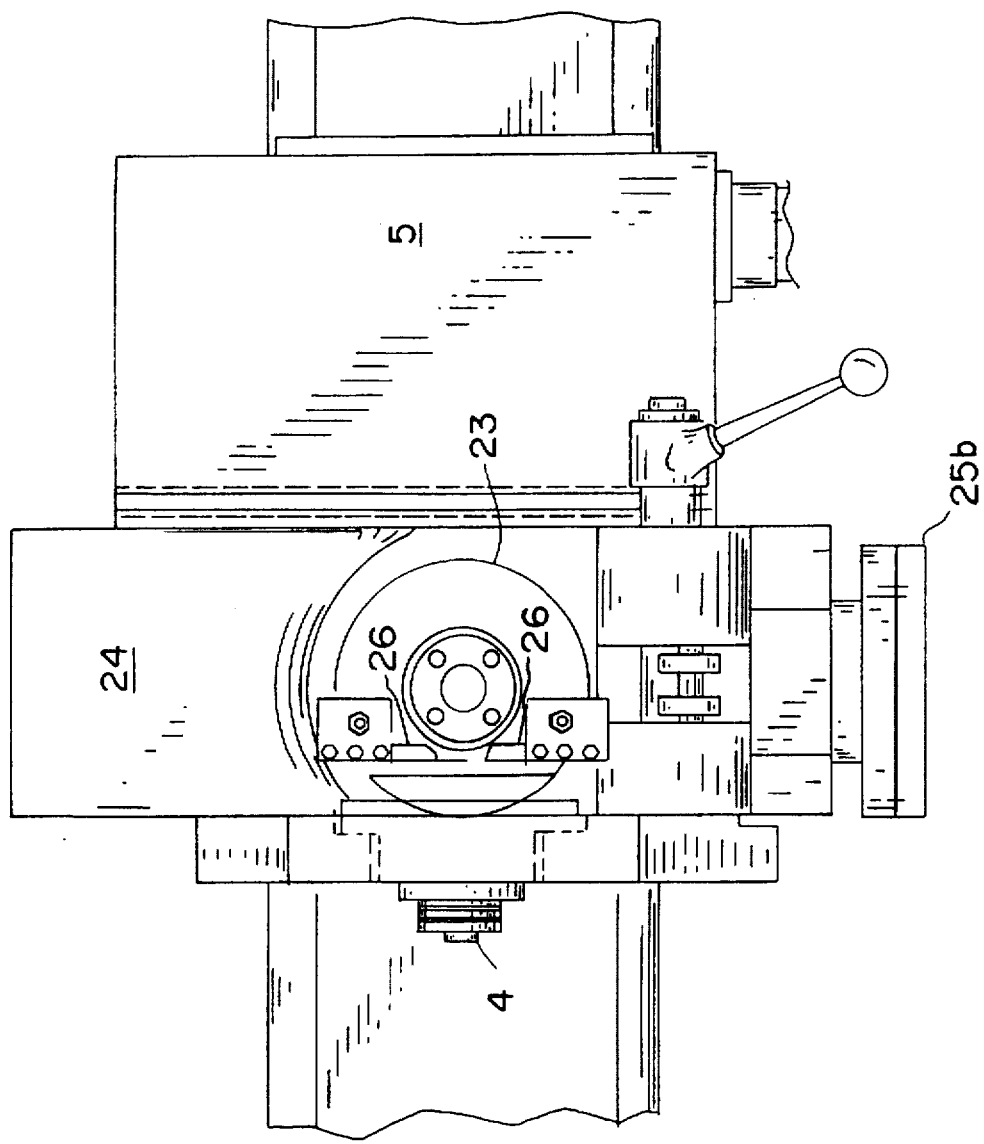
FIG. 3 is a top view of the tool support and carriage of the lathe attachment of FIG. 1.

FIG. 3 is a top view of the tool support 23 and carriage 5 of the lathe attachment of FIG. 1. FIG. 3 depicts the alignment of the cutting tools 26 to the center of the guide bushing 4 and the slight annular gap (in broken lines) between the collar 10 and the through-hole 11 in the guide bushing support plate 3 which allows for adjusting the alignment of the guide bushing.

FIG. 4 is and end view of the tool support and carriage of the lathe attachment of FIG. 1. The axial alignment of the chuck 32 and the guide bushing 4 is shown in FIG. 4 together with the positioning of the cutting tools 26 and their respective holders 33. Although FIG. 4 is directed to an embodiment in which cutting tools 26 are supported by holders 33 attached to tool support 23, it is easy to see from this figure how cutting tools 26, holders 33, and tool support 23 could be eliminated and additional auxiliary cutting tools and sliding tool holders could be positioned on the guide bushing support plate 3 in essentially the same position (with respect to a workpiece) as the illustrated cutting tools 26.

The installation of the lathe attachment of the present invention will be described with reference to its use in conjunction with the HC™-AT Chucking Machine (Hardinge Brothers, Inc., Elmira, N.Y.). This description is provided for example only and is not to be considered limiting, inasmuch as the lathe attachment of the present invention can be used in conjunction with numerous machine lathes.

Prior to a first installation procedure, the surface of the carriage 5 facing the spindle 12 has to be provided with means to secure the guide bushing support plate 3 thereto. In the case of bolting the guide bushing support plate 3 onto the carriage 5, it is necessary to drill and tap holes 9 in the surface of the carriage 5 which faces the spindle 12. These holes 9 need to be aligned with corresponding through-holes 8 which are provided in the bottom portion of the guide bushing support plate 3. Once such holes are provided, the guide bushing support plate 3 is attached to the surface of the carriage 5 which faces the spindle 12.

One manner of forming the threaded holes 9 in the surface of the carriage 5 which faces the spindle 12 is to remove the carriage 5 and drill and tap the holes using a drill press, a vertical mill, or similar machine. Alternatively, a drill guide can be provided which attaches to the bed 6 of the lathe. One or more drills mounted to the drill guide can be used to drill and tap the holes 9 by moving the carriage 5 toward the drill guide. Alternatively, the drill guide could include a mechanism for moving it along the bed 6 of the lathe toward the carriage 5. Such a mechanism could be similar to that which moves the carriage 5.

Next, that guide bushing 4, guide bushing collar 10, and guide bushing sleeve 17 (or guide bushing and collar/bearing assembly) are assembled together as a unit and positioned in the through-hole 11 in the guide bushing support plate 3. The fastening means, e.g., bolts 34 which are used to secure the guide bushing collar 10 to the guide bushing support plate 3 are loosely tightened so that the guide bushing 4 can be centered with respect to the lathe spindle 12. Once the guide bushing 4 is centered with respect to the spindle 12, the fastening means, e.g., bolts 34 which are used to secure the guide bushing collar 12 to the guide bushing support plate 3 are securely tightened.

Next, the turret is detached from the cross slide 24 and the tool support 23 is attached to the turret shaft 35 and secured thereto by suitable threaded attachment means. For this purpose, the tool support 23 includes a cylindrical shaped base which is similar in shape to the base of the removed turret.

After the tool support 23 is attached to the cross slide 24, the tool holders 33 can be attached to the top surface of the tool support 23 utilizing conventional securing means, e.g., threaded bolts 36. The auxiliary tool holder(s) 28 can likewise be attached to the top portion of the guide bushing support plate 3 in a similar manner, after the guide bushing support plate 3 is attached to the carriage 5.

In operation, after the lathe attachment of the present invention has been installed on a lathe, the headstock end of a workpiece is secured in the chuck 32 of spindle 12 and the tailstock of the workpiece is inserted into and through the guide bushing 4 by moving the carriage 5 toward the spindle 12. The position of the cutting tools 26 is adjusted in a conventional manner and the workpiece is caused to rotate.

During rotation of the workpiece, the carriage 5 is caused to move longitudinally or axially toward the spindle 12. At the same time, the cross slide 24 is caused to move laterally so that the cutting tools 26 move radially with respect to the workpiece. The combined movements of the carriage 5 and cross slide 24 are controlled to provide a desired machining to the workpiece which can subsequently be cut off (or further machined) by the auxiliary cutting tool(s) 27.

Movement of the cross slide 24, carriage 5, and auxiliary cutting tool(s) 27 can be effected by manual or automatic operation, utilizing conventional means and techniques. For example, servomotors controlled by a computer or similar processor could be used to move the cross slide 24, carriage 5, and auxiliary cutting tool(s) 27.

In instances wherein the lathe attachment of the present invention is to be used in conjunction with lathes which do not include carriage assemblies, it would be necessary to attach a carriage assembly to such lathes.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. In a lathe having a longitudinal bed, a chuck or collet for securing one end of a workpiece, and a spindle for rotating the chuck or collet and workpiece about a central axis, the improvement comprising:
   a guide bushing for receiving and holding another end of the workpiece along the central axis; and
   a tool support for holding at least one cutting tool, said guide bushing and said tool support being secured to and movable together along said longitudinal bed.

2. A lathe according to claim 1, wherein said guide bushing and said tool support are connected to a movable carriage provided on said longitudinal bed.

3. A lathe according to claim 2, wherein said tool support is attached to a cross slide which is connected to said carriage.

4. A lathe attachment according to claim 2, wherein said guide bushing is held by a support plate which is connected to said carriage.

5. A lathe according to claim 4, further including at least one auxiliary cutting tool connected to an upper portion of said support plate.

6. A lathe attachment according to claim 5, wherein said at least one auxiliary cutting tool is movably connected to an upper portion of said support plate.

7. A lathe according to claim 6, further including means to move said at least one auxiliary cutting tool in a radial direction with respect to the central axis.

8. A lathe according to claim 7, wherein said means to move said at least one auxiliary cutting tool comprises a manually operable mechanism.

9. A lathe according to claim 7, wherein said means to move said at least one auxiliary cutting tool comprises an automatically controlled mechanism.

10. In a lathe having a longitudinal bed, a chuck or collet for securing one end of a workpiece, and a spindle for rotating the chuck or collet and workpiece about a central axis, the improvement comprising:
    a guide bushing for receiving and holding another end of the workpiece along the central axis;
    a support plate for supporting said guide bushing, said support plate being secured to and movable along said longitudinal bed; and
    at least one cutting tool mounted on said support plate and being movable in a radial direction with respect to the central axis.

11. A lathe according to claim 10, wherein said support plate is connected to a movable carriage provided on said longitudinal bed.

12. A lathe according to claim 10, further including means to move said at least one cutting tool mounted on said support plate along said radial direction.

13. A lathe according to claim 12, wherein said means to move said at least one cutting tool comprises a manually operable mechanism.

14. A lathe according to claim 12, wherein said means to move said at least one cutting tool comprises an automatically controlled mechanism.

15. An attachment for a lathe which comprises:
   a guide bushing for receiving and holding an end of a rotating workpiece;
   a support plate for supporting said guide bushing; and
   means for mounting said support plate to the bed of a lathe so that said support plate and said guide bushing are movable with respect to the lathe.

16. An attachment for a lathe according to claim 15, further including at least one cutting tool attached to said support plate.

17. An attachment for a lathe according to claim 15, further including a tool support and means for connecting said tool support to said means for mounting so that said tool support is movable with respect to the lathe together with said support plate and so that said tool support is movable with respect to said support plate.

18. A method of machining elongated workpieces which comprises:
   securing one end of an elongated workpiece in a chuck or collet of a lathe;
   positioning an opposite end of said workpiece through a guide bushing, said guide bushing being spaced apart from said chuck or collet; and
   rotating said chuck or collet and said workpiece while:
      moving said guide bushing along said elongated workpiece and
      contacting said workpiece with at least one cutting tool.

19. A method of machining elongated workpieces according to claim 18, further comprising moving said at least one cutting tool along said elongated workpiece together with said guide bushing.

20. A method of machining elongated workpieces according to claim 19, further comprising moving said at least one cutting tool in a radial direction with respect to said elongated workpiece.

* * * * *